United States Patent
Pandharipande et al.

(10) Patent No.: US 10,142,793 B2
(45) Date of Patent: Nov. 27, 2018

(54) LOCALIZATION BASED ON MOTION DETECTION OF THE MOBILE DEVICE

(71) Applicant: PHILIPS LIGHTING HOLDING B.V., Eindhoven (NL)

(72) Inventors: Ashish Vijay Pandharipande, Eindhoven (NL); Hongming Yang, Eindhoven (NL); Xianyu Wang, Eindhoven (NL); Armand Michel Marie Lelkens, Heerlen (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/559,214

(22) PCT Filed: Mar. 15, 2016

(86) PCT No.: PCT/EP2016/055515
§ 371 (c)(1),
(2) Date: Sep. 18, 2017

(87) PCT Pub. No.: WO2016/146617
PCT Pub. Date: Sep. 22, 2016

(65) Prior Publication Data
US 2018/0077533 A1    Mar. 15, 2018

(30) Foreign Application Priority Data
Mar. 17, 2015    (EP) .................................... 15159400

(51) Int. Cl.
*H04W 4/00*    (2018.01)
*H04W 4/029*    (2018.01)
(Continued)

(52) U.S. Cl.
CPC ........... *H04W 4/029* (2018.02); *G01S 5/0294* (2013.01); *H04W 4/027* (2013.01)

(58) Field of Classification Search
CPC ................................................ G01S 5/02944
See application file for complete search history.

(56) References Cited

U.S. PATENT DOCUMENTS 8,971,915 B2* 3/2015 Alizadeh-Shabdiz ................. G01S 5/0278
455/418
2004/0072556 A1* 4/2004 Frantti ..................... G01P 7/00
455/404.2
(Continued)

FOREIGN PATENT DOCUMENTS

EP    1739879 A1    3/2007
WO    2006073816 A2    7/2006
(Continued)

*Primary Examiner* — Khai M Nguyen
(74) *Attorney, Agent, or Firm* — Meenakshy Chakravorty (57) ABSTRACT

A method of tracking a location of a mobile device based on measurements of beacon signals transmitted between the mobile device and wireless reference nodes of a localization network. The method comprises: detecting motion of the mobile device; repeatedly applying a tracking algorithm to track the location of the mobile device, wherein the tracking algorithm is configured to estimate a current location of the mobile device by taking into account both (A) a current set of measurements of the beacon signals transmitted between the mobile device and at least some of the reference nodes and (B) one or more past sets of said measurements transmitted between the mobile device and at least some of the reference nodes; and adapting the tracking algorithm by, in dependence on the detected motion of the mobile device, adapting a relative significance attributed to the one or more sets of past measurements relative to the current set of measurements and by adapting the time-density of the beacon signals in dependence on the detected motion of the mobile device.

14 Claims, 2 Drawing Sheets

(51) Int. Cl.
*G01S 5/02* (2010.01)
*H04W 4/02* (2018.01)

(56) References Cited

U.S. PATENT DOCUMENTS

| | | | | |
|---|---|---|---|---|
| 2005/0046608 A1* | 3/2005 | Schantz | .................... | G01S 5/14 |
| | | | | 342/127 |
| 2005/0143092 A1* | 6/2005 | Tamaki | ................. | H04W 64/00 |
| | | | | 455/456.1 |
| 2014/0206411 A1 | 7/2014 | Ruutu et al. | | |
| 2014/0274225 A1* | 9/2014 | Lacatus | ................. | H04W 24/08 |
| | | | | 455/574 |
| 2016/0353246 A1* | 12/2016 | Elias | ..................... | H04W 4/029 |
| 2017/0295461 A1* | 10/2017 | Smith | ..................... | H04W 4/02 |
| 2017/0356744 A1* | 12/2017 | Klipp | ................... | G01C 21/206 |

FOREIGN PATENT DOCUMENTS

| | | |
|---|---|---|
| WO | 2013005081 A1 | 1/2013 |
| WO | 2014083494 A2 | 6/2014 |

\* cited by examiner

LOCALIZATION BASED ON MOTION DETECTION OF THE MOBILE DEVICE

CROSS-REFERENCE TO PRIOR APPLICATIONS

This application is the U.S. National Phase application under 35 U.S.C. § 371 of International Application No. PCT/EP2016/055515, filed on Mar. 15, 2016, which claims the benefit of European Patent Application No. 15159400.9, filed on Mar. 17, 2015. These applications are hereby incorporated by reference herein.

TECHNICAL FIELD

The present disclosure relates to localization, i.e. the process of determining the location of a mobile device based on a network of wireless nodes.

BACKGROUND

In a localization system such as an indoor positioning system, the location of a wireless device such as a mobile user terminal can be determined with respect to a location network comprising a plurality of wireless reference nodes, in some cases also referred to as anchor nodes. These anchors are wireless nodes whose locations are known a priori, typically being recorded in a location database which can be queried to look up the location of a node. The anchor nodes thus act as reference nodes for localization. Measurements are taken of the signals transmitted between the mobile device and a plurality of anchor nodes, for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration or triangulation. Given the relative location of the mobile terminal and the known locations of the anchor nodes, this in turn allows the location of the mobile device to be determined in more absolute terms, e.g. relative to the globe or a map or floorplan.

Another localization technique is to determine the location of mobile device based on a "fingerprint" of a known environment. The fingerprint comprises a set of data points each corresponding to a respective one of a plurality of locations throughout the environment in question. Each data point is generated during a training phase by placing a wireless device at the respective location, taking a measurement of the signals received from or by any reference nodes within range at the respective location (e.g. a measure of signal strength such as RSSI), and storing these measurements in a location server along with the coordinates of the respective location. The data point is stored along with other such data points in order to build up a fingerprint of the signal measurements as experienced at various locations within the environment. Once deployed, the signal measurements stored in the fingerprint can then be compared with signal measurements currently experienced by a mobile device whose location is desired to be known, in order to estimate the location of the mobile device relative to the corresponding coordinates of the points in the fingerprint. For example this may be done by approximating that the device is located at the coordinates of the data point having the closest matching signal measurements, or by interpolating between the coordinates of a subset of the data points having signal measurements most closely matching those currently experienced by the device. The fingerprint can be pre-trained in a dedicated training phase before the fingerprint is deployed by systematically placing a test device at various different locations in the environment. Alternatively or additionally, the fingerprint can built up dynamically by receiving submissions of signal measurements experienced by the actual devices of actual users in an ongoing training phase.

The determination of the mobile device's location may be performed according to a "device-centric" approach or a "network-centric" approach. According to a device centric approach, each anchor or reference node emits a respective beacon signal. The mobile device takes measurements of beacon signals it receives from the reference nodes, obtains the locations of those nodes from the location server, and performs the calculation to determine its own location at the mobile device itself. According to a network-centric approach on the other hand, the reference nodes are used to take measurements of beacon signals received from the mobile device, and an element of the network such as the location server performs the calculation to determine the mobile device's location. Hybrid approaches are also possible, e.g. where the mobile device takes the raw measurements but forwards them to the location server to calculate its location (also sometimes referred to as an "assisted" approach).

There are various reasons why it may be desirable to be able to detect the location of a wireless device, such as to provide location based services. For instance, one application of a positioning system is to automatically provide a wireless mobile device with access to control of a utility such as a lighting system, on condition that the mobile device is found to be located in a particular spatial region or zone associated with the lighting or other utility. E.g. access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include indoor navigation, location-based advertising, service alerts or provision of other location-related information, user tracking, asset tracking, or taking payment of road tolls or other location dependent payments.

It is also known to incorporate the beaconing functionality of an anchor node into another unit that is designed to provide another utility such as lighting into the environment in question, rather than the anchor node being a separate, dedicated, stand-alone unit. Consider for example a smart lighting system with wireless lighting control and radio-based indoor positioning. Here each node of the positioning system is also a luminaire for illuminating the environment.

There is a trend toward having greater connectivity and intelligence in lighting systems. Wireless RF-networked lighting systems will play an important role with the desire for easier commissioning and control of lighting systems. A resulting consequence will be a dense deployment of wireless nodes, e.g. one wireless anchor node per luminaire or a wireless anchor node for a group of luminaires in a room. A dense deployment of wireless anchor nodes has been considered in WO2014/083494. The technique described in WO2014/083494 uses "RF zoning", whereby instead of trying to compute the actual point position of the device using techniques such as triangulation, trilateration or multilateration, instead the anchor nodes are divided into groups corresponding to discrete zones and the location is determined in terms of which zone the mobile device is estimated to be found in, depending on which zone experiences the highest average signal strength. For a dense deployment of nodes, this can be less computationally complex than computing the position using techniques such as trilateration or multilateration, and/or less onerous in terms of commissioning.

Further, existing triangulation, trilateration or multilateration techniques based on only an instantaneous set of radio beacon measurements suffer from the intrinsic randomness in the radio signal measurements. For instance, even when a mobile user device is static, the estimated position may fluctuate due to random variations in the RSSI measurements (or the like). Hence as well as being spatially averaged, in the RF zoning technique of WO2014/083494 the signals are also temporally averaged in order to try to minimize the effect of short-term fluctuations.

SUMMARY

The temporal averaging takes into account both past and current beacon measurements, so that anomalous short-term fluctuations in the current measurements are tempered by the lasting effect of the past measurements, resulting in a more stable estimate. However, even the technique of temporal averaging, whether applied in context of zoning or other positioning techniques, could be improved upon in terms of its behaviour in the face of anomalous short-term fluctuations (occurring due to errors in the beacon signals or their measurement, whether the errors are random, or caused by some deterministic but time-varying and difficult-to-predict phenomenon other than an actual change in location of the mobile device).

For instance, an algorithm that places too little weight on the past measurements may result in estimating that the user has jumped to a new zone when in actual fact one or more of the instantaneous beacon measurements have simply experienced a temporary "blip". E.g. this may in turn result in denying a user access to a particular location-based service associated with the user's true zone. On the other hand, an algorithm that places too much weight on past measurements may be slow to adapt to true changes in the user's location. E.g. this may in turn result in the system being slow to grant the user access to a location-based service in a newly entered zone.

To address this, the following provides a technique whereby the relative significance attributed to the current and past results is adapted depending on detected motion of the mobile device (e.g. based on one or more inertial sensors on board the mobile device, such as one or more accelerometers).

Hence according to one aspect disclosed herein, there is provided an apparatus comprising a localization module for tracking a location of a mobile device based on measurements of beacon signals transmitted between the mobile device and wireless reference nodes of a localization network, wherein the localization module is configured to perform operations of: detecting motion of the mobile device (whether by sensing the motion of the mobile device or following the tracked location of the mobile device at said apparatus, or by receiving an indication of a sensed or tracked motion of the mobile device from elsewhere); repeatedly applying a tracking algorithm to track the location of the mobile device, wherein the tracking algorithm is configured to estimate a current location of the mobile device by taking into account both (A) a current set of measurements of the beacon signals transmitted between the mobile device and at least some of said reference nodes and (B) one or more past sets of said measurements transmitted between the mobile device and at least some of said reference nodes; and adapting the tracking algorithm by, in dependence on said detected motion of the mobile device, adapting a relative significance attributed to the one or more sets of past measurements relative to the current set of measurements.

Thus the tracking algorithm is based on a combination of both current beacon measurements and past beacon measurements, so that the location estimate does not "flit" about too readily if a current set of measurements happens to contain random errors or other anomalies; but in addition, the relative weight given to current and past measurements is now adapted depending on the user's motion. So for instance, if the user is detected to be stationary (e.g. based on accelerometer readings), it is less likely that sudden changes in the current beacon measurements are due to an actual change in location and more likely they are just a blip, so the algorithm gives more credence to past measurements; and vice versa if the user is detected to be moving (e.g. again based on accelerometer readings) it is more likely that changes in the beacon measurements are due to an actual change in location, and so the algorithm gives more credence to the current measurements.

Preferably, to reduce complexity (e.g. in the case of a dense distribution of nodes), the tracking algorithm may be configured to estimate the current location of the mobile device, based on said current and past measurements, in terms of which of a plurality of discrete zones the mobile device is presently estimated to belong to, each respective one of the zones corresponding to a respective group of the reference nodes (as opposed to performing a positioning calculation such as trilateration, multilateration, triangulation to try compute the actual point coordinates of the mobile device). This approach may be referred to as "zoning", e.g. RF zoning; i.e. working in terms of zones rather than point coordinates. E.g. the approximation of zoning may be used in the case where the zones are also service zones of a location-based service, i.e. whether the mobile device is granted access to the service in dependence on being in a certain service zone or zones, and/or which functionality the mobile device is granted access to depends on which service zone the mobile device is determined to be in. An example of a zoning type tracking algorithm would be to compute a score for each zone, representing a likelihood that the mobile device is found in the respective zone, wherein the score comprises or is based on an average of the measurements (e.g. average received signal strength or time-of-flight) of the signals transmitted from/to a plurality of the reference nodes. The zoning-based tracking algorithm then selects the zone with the highest score as the zone which the mobile device is most likely to belong to.

The adaptive tracking algorithm of the present disclosure is particularly (but not exclusively) applicable in the case of zoning, as otherwise an anomalous variation in the current beacon measurements could result in a location estimate flitting suddenly between zones (especially if the user is near a zone boundary). For example this could deny the user access to a location-based service which he or she would otherwise be entitled based on his or her location, e.g. control of the lighting in a certain zone.

To further simplify the calculation, in embodiments the localization module may be configured to detect the motion of the mobile device by determining a discrete classification of a state of said motion, and to perform said adaptation based on the discrete classification (as opposed to a continuously variable measure of, say, speed, velocity or acceleration).

For example, said discrete classification comprises one or more of: whether the mobile device is static or moving, whether a user accompanying the mobile device is static or walking, whether a user accompanying the mobile device is walking or running, whether the motion is indicative of the mobile device travelling beyond a threshold speed or within the threshold speed, whether a user accompanying the mobile device is travelling on foot or by vehicle, and/or whether the state of motion is one or the above or is indeterminate.

In embodiments, the algorithm may comprise an average contribution of some or all of the current measurements and some or all of the past measurements, averaged over a time window, and the localization module may be configured to perform said adaptation by adapting said time window.

In embodiments, the algorithm may comprise a first term based on only some or all of the current measurements or only some or all of the past measurements, and a second term at least based on some or all of the other of the current or past measurements, with one or both of the first and second terms being weighted by a respective weighting parameter; and the localization module may be configured to perform said adaptation by adapting the weighting parameter of one or both of the first and second terms. For example, said parameter may be a factor by which the respective term is multiplied.

In further embodiments, said first term may be based on only some or all of the past measurements, and said second term comprises an average contribution of some or all of the current measurements and some or all of the past measurements, averaged over a time window.

In yet further embodiments: the tracking algorithm may be configured to operate by allocating a respective score to each respective one of some or all of the zones representing a likelihood that the mobile device belongs to the respective zone, and selecting the zone having the highest score as the zone in which the mobile device is estimated to belong to; the score for each zone may comprise a sum of said first term and said second term, the first term comprising the respective score from a previous one of said repeated applications of said algorithm, and the second term comprising the average, over said time window, of the current and past measurements of the beacon signals transmitted between the mobile device and only the reference nodes corresponding to the respective zone; and the localization module may be configured to perform said adaptation by adapting the time window of the average and/or the weighting parameter of one or both of the first and second terms.

In some embodiments, the detected motion may be used not only to adapt the tracking algorithm, but also to adapt the beaconing or beaconing-related behaviour of the system. Beaconing is more critical when the user moving than when stationary, and so to save power, beaconing may be adapted to be more frequent and/or to be conducted or measured in more zones when the device is moving than when not.

Hence in embodiments, optionally the localization module may be further configured to adapt a time-density of one, some or all of said beacon signals in dependence on the detected motion of the mobile device, such that the time-density is increased when the mobile device 8 is detected to exhibit a greater degree of motion.

As another example, the beacon signals may be transmitted from the reference nodes to the mobile device, and the localization module may be further configured to control the beacon signals to only be transmitted from the reference nodes corresponding to the zone which the mobile device is currently estimated to belong to, and/or from one or more adjacent zones to that which the mobile device is currently estimated to belong to; or the localization module may be configured to control the beacon signals to be transmitted with a greater time-density from the reference nodes corresponding to the zone which the mobile device is currently estimated to belong to, and/or with a greater time-density from one or more adjacent zones to that which the mobile device is currently estimated to belong to, the time-density being greater relative to one, some or all others of said zones;

As yet another example, the beacon signals may be transmitted from the mobile device to the reference nodes, and the localization module may be further configured to control the reference nodes so that only the reference nodes corresponding to the zone in which the mobile device is currently estimated to be, or only a subset of the zones comprising the zone in which the mobile device is currently estimated to be and one or more adjacent zones, take measurements of the beacon signals.

In one exemplary implementation, the apparatus comprising the localization module takes the form of a location server of the localization network.

In this case, the detecting of the motion of the mobile device may comprise detecting the motion based on reports received from the mobile device, reporting readings from one or more inertial sensors on-board the mobile device (e.g. one or more accelerometers, gyroscopes and/or magnetometers). Alternatively or additionally, the detection may comprise observing the varying location estimate performed by the location server (in a network centric approach) or as reported to the location server by the mobile device (in a device centric approach). Or in another alternative, the detection of the mobile device's motion may even comprise receiving an indication of the motion classification from the device (an even more device centric approach). As yet another example, the detecting of the mobile device's motion may comprise receiving an indication from a separate motion sensing system, such as a such as a separate occupancy detection system (e.g. based on infrared or ultrasound sensors installed in the same environment). Also, when the localization module is implemented at the location server, note that any control of the beaconing may comprise controlling the beaconing performed by the nodes (in the case of device centric measurements), or sending a request to the mobile device to adapt its beaconing (in the case of network centric measurements).

In an alternative implementation, the apparatus comprising the localization module comprises the mobile device itself.

In this case, the detecting of the motion of the mobile device may comprise using one or more inertial sensors on-board the mobile device (e.g. one or more accelerometers, gyroscopes and/or magnetometers). Alternatively or additionally, the detection may comprise observing the varying location estimate as performed by the mobile device (in a device centric approach) or as reported to the mobile device by the location server (in a network centric approach). As another alternative, the detection of the mobile device's motion may even comprise receiving an indication of the motion classification from the server (an even more network centric approach), or from some other separate motion sensing system such as a separate occupancy detection system (e.g. based on infrared or ultrasound sensors installed in the same environment). Also, when the localization module is implemented at the mobile device, any control of the beaconing may comprise controlling beaconing performed by the mobile device (in the case of network centric measurements), or sending a request to the location network to adapt the beaconing from its nodes (in the case of device centric measurements).

According to another aspect of the present disclosure, there is provided a method of tracking a location of a mobile device based on measurements of beacon signals transmitted between the mobile device and wireless reference nodes of a localization network, wherein the method comprises: detecting motion of the mobile device; repeatedly applying a tracking algorithm to track the location of the mobile device, wherein the tracking algorithm is configured to estimate a current location of the mobile device by taking into account both (A) a current set of measurements of the beacon signals transmitted between the mobile device and at least some of said reference nodes and (B) one or more past sets of said measurements transmitted between the mobile device and at least some of said reference nodes; and adapting the tracking algorithm by, in dependence on said detected motion of the mobile device, adapting a relative significance attributed to the one or more sets of past measurements relative to the current set of measurements.

In embodiments, the method may further comprise steps in accordance with any of the apparatus features disclosed herein.

According to another aspect disclosed herein, there is provided a computer program product for tracking a location of a mobile device based on measurements of beacon signals transmitted between the mobile device and wireless reference nodes of a localization network, wherein the computer program product comprises code embodied on a computer-readable storage medium and/or being downloadable therefrom, and configured so as when run to perform operations of: detecting motion of the mobile device; repeatedly applying a tracking algorithm to track the location of the mobile device, wherein the tracking algorithm is configured to estimate a current location of the mobile device by taking into account both (A) a current set of measurements of the beacon signals transmitted between the mobile device and at least some of said reference nodes and (B) one or more past sets of said measurements transmitted between the mobile device and at least some of said reference nodes; and adapting the tracking algorithm by, in dependence on said detected motion of the mobile device, adapting a relative significance attributed to the one or more sets of past measurements relative to the current set of measurements.

In embodiments, the computer program product may be further configured to perform operations in accordance with any of the apparatus features disclosed herein.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF PREFERRED EMBODIMENTS

Figure 1:
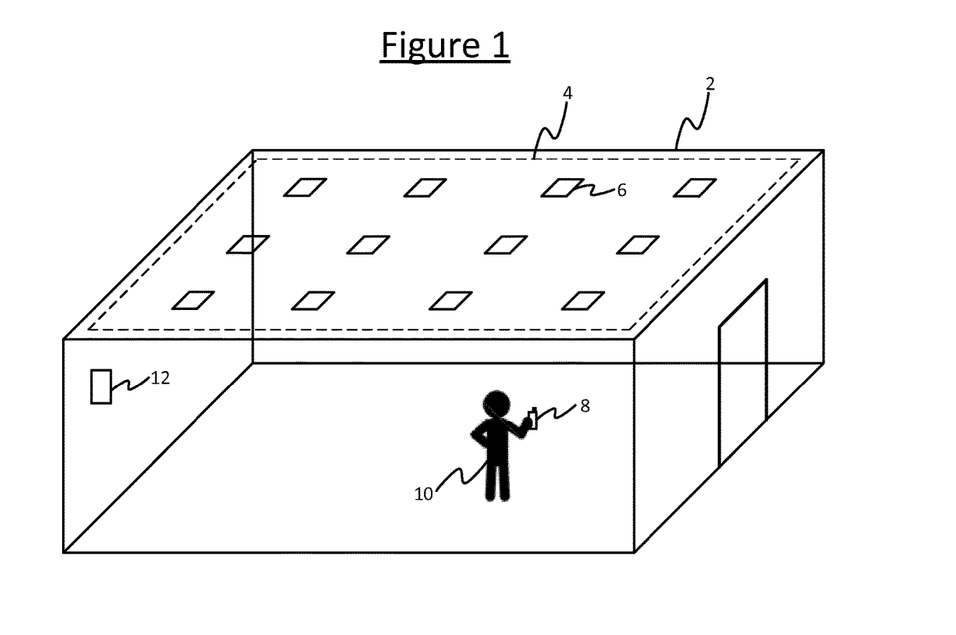
FIG. 1 is a schematic representation of an environment comprising a localization system in the form of an indoor positioning system.

FIG. 1 illustrates an example of a positioning system (localization system) installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positioning system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings. The following will be described in terms of the reference nodes 6 being anchor nodes of an indoor positioning system or the like, but it will be appreciated this is not necessarily the case in all possible embodiments.

The environment 2 is occupied by a user 10 having a wireless device 8 disposed about his or her person (e.g. carried by hand, or in a bag or pocket). The wireless device 8 takes the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about a being or object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 10, being or object about which it is disposed.

Figure 2:
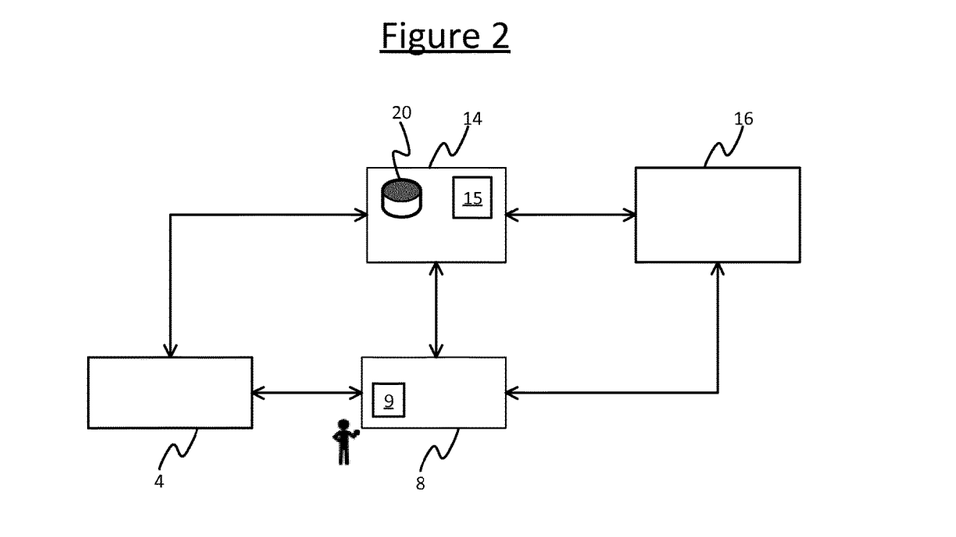
FIG. 2 is a schematic block diagram of a system for providing a location based service.

Referring to FIGS. 1 and 2, the environment 2 also comprises at least one wireless access point or router 12 enabling communication with a location server 14 (comprising one or more server units at one or more sites). The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2. The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi, Zigbee or Bluetooth, using which each of the anchor nodes 6 is able to wirelessly communicate via the access point 12 and therefore with the location server 14. Alternatively it is not excluded that instead of using a wireless access point 12, each of the anchor nodes 6 could be provided with a wired connection to the location server 14, or one or more of the anchor nodes 6 could be arranged to act as an access point for the others. The following may be described in terms of a wireless connection via an access point 12 or the like, but it will be appreciated that this is not limiting to all possible embodiments.

The mobile device 8 is also able to communicate via the wireless access point 12 using the relevant radio access technology, e.g. Wi-Fi, Zigbee or Bluetooth, and thereby to communicate with the location server 14. Alternatively or additionally, the mobile device 8 may be configured to communicate with the location server 14 via other means, e.g. a wireless cellular network such as a network operating in accordance with one or more 3GPP standards. Further, the mobile device 8 is able to wirelessly receive beacon signals from, or transmit beacon signals to, any of the anchor nodes 6 that happen to be in range. In embodiments this communication may be implemented via the same radio access technology as used to communicate with the access point 12, e.g. Wi-Fi, Zigbee or Bluetooth, though that is not necessarily the case in all possible embodiments.

Generally any of the communications described in the following may be implemented using any of the above options or others for communicating between the respective entities 6, 8, 12, 14 and for conciseness the various possibilities will not necessarily be repeated each time.

The beacon signals between the anchor nodes 6 and the mobile device 8 are the signals whose measurements are used to determine the location of the mobile device 8. In a device-centric approach the anchor nodes 6 each broadcast a signal and the mobile device 8 listens, detecting one or more of those that are currently found in range and taking a respective signal measurement of each. Each anchor node 6 may be configured to broadcast its beacon signal repeatedly. The respective measurement taken of the respective beacon signal from each detected anchor node 6 may for example comprise a measurement of signal strength (e.g. RSSI), time of flight (ToF), angle of arrival (AoA), and/or any other property that varies with distance or location.

In a network-centric approach on the other hand, the mobile device 8 broadcasts a beacon signal and the anchor nodes 6 listen, detecting an instance of the signal at one or more of those nodes 6 that are currently in range. In this case the mobile device 8 may broadcast its beacon signal repeatedly. The respective measurement taken of each instance of the beacon signal from the mobile device 8 may comprise a measure of signal strength (e.g. RSSI) or time of flight (ToF), angle of arrival (AoA), and/or any other property that varies with distance or location. In an example of a hybrid or assisted approach, the nodes 6 may take the measurements but then send them to the mobile device 8, or the mobile device 8 may take the measurements but send them to the location server 14.

There are various options for the manner in which such measurements may be started and conducted. For example, either the mobile device 8 may initiate the transmission upon which the measurement is based, or the network may initiate the transmission. Both are possible, but it may have some impact how the rest of the process is implemented, in particular for time-of-flight measurements. Time-of-flight measurements can be obtained by establishing either a one way transmission delay or a two-way transmission delay (round trip time, RTT). A measurement of one-way delay can suffice if all relevant elements in the network have a synchronized clock or can reference a common clock. In this case the mobile device 8 may initiate the measurement with a single message transmission, adding a timestamp (e.g. time or time+date) of transmission to the message. If on the other hand the measurement is not based on a synchronized or common clock, the anchor or reference nodes 6 can still perform a measurement by bouncing individual messages back from the mobile device 8 and determining the round-trip time-of-flight. The latter may involve coordination from the nodes attempting to measure.

In the case of signal strength measurements, there are also different options for implementing these. The determination of distance from signal strength is based on the diminishment of the signal strength over space between source and destination, in this case between the mobile device 8 and anchor or reference node 6. This may for example be based on a comparison of the received signal strength with a-prior knowledge of the transmitted signal strength (i.e. if the nodes 6 or mobile device 8 are known or assumed to always transmit with a given strength), or with an indication of the transmitted signal strength embedded in the signal itself, or with the transmitted signal strength being communicated to the node 6 or device 8 taking the measurement via another channel (e.g. via location server 14).

Any one or a combination of these approaches or others may be applied in conjunction with the system disclosed herein. Whatever approach is chosen, once a beacon signal measurement is available from or at each of a plurality of the anchor nodes 6, it is then possible to determine the location of the mobile device 8 relative to the location network 4 using a technique such as trilateration, multilateration, triangulation and/or a fingerprint based technique, or, in accordance with embodiments discussed in more detail below, a "zoning" based technique.

In addition, the "absolute" locations of the anchor nodes 6 (or more generally reference nodes) are known, for example from a location database maintained by the location server 14, or by the respective location of each anchor node 6 being stored at the node itself (e.g. and communicated from each relevant nodes to the mobile device 8 in a device centric approach). The absolute location is a physical location of the node in a physical environment or framework, being known for example in terms of a geographic location such as the location on a globe or a map, or a location on a floorplan of a building or complex, or any real-world frame of reference.

By combining the relative location of the mobile device 8 with the known locations of the anchor nodes 6 used in the calculation, it is then possible to determine the "absolute" location of the mobile device 8. Again the absolute location is a physical location of the device in a physical environment or framework, for example a geographic location in terms of the location on a globe or a map, or a location on a floorplan of a building or complex, or any more meaningful real-world frame of reference having a wider meaning than simply knowing the location relative to the location network 4 alone.

In embodiments, the absolute location of the nodes 6 may be stored in a human understandable form and/or the absolute location of the mobile device 8 may be output in a human understandable form. For example, this may enable the user 10 to be provided with a meaningful indication of his or her location, and/or may enable the administrator of a location-based service to define rules for granting or prohibiting access to the service or aspects of the service. Alternatively it is possible for the location of the nodes 6 and/or mobile device 8 to only ever be expressed in computer-readable form, e.g. to be used internally within the logic of the location based service.

In other embodiments it is not excluded that the location is only ever expressed relative to the location network 4, 6 and not as a more meaningful "absolute" location. For example if each anchor node 6 is integrated with a respective luminaire (see below) and the location is being determined for the purpose of controlling those luminaires, then in some embodiments it may only be necessary to determine the user's location relative to the framework of points defined by the anchor nodes of these luminaires (though in other similar arrangements it may still be desired to define lighting control regions relative to the floorplan of a building or the like).

In a device-centric approach, the beacon signal from each anchor node 6 comprises an ID of the respective anchor node. The mobile device 8 then uses these IDs to look up the locations of the relevant nodes 6 by querying the location server 14 (e.g. via the wireless access point 12). Alternatively the beacon signal from each node 6 could even comprise an explicit indication of the respective location. Either way, the mobile device 8 can then perform the calculation to determine its own location at the device 8 itself (relative to the location network 4 and/or in absolute terms). In a network-centric approach on the other hand, the beacon signal comprise an ID of the mobile device 8, and the anchor nodes 6 submit the beacon signal measurements they took to the location server 14 along with the mobile device's ID (e.g. via the wireless access point 12). The location server 14 then performs the calculation of the device's location at the server 14 (again relative to the location network 4 and/or in absolute terms). In an example of a hybrid approach, the mobile device 8 may take the measurements of the beacon signals from the nodes 6, but submit them along with the respective received IDs to the location server 14 in a raw or partially processed form for the calculation to be performed or completed there (an assisted approach).

Typically a beacon signal measurement is needed from at least three reference nodes 6, though if other information is taken into account then it is sometimes possible to eliminate impossible or unlikely solutions based on two nodes. For example, if the location is assumed to be constrained to a single level (e.g. ground level or a given floor of a building), the measurement from any one given node 6 defines a circle of points at which the mobile device 8 could be located. Two nodes give two circles, the intersection of which gives two possible points at which the mobile device 8 may be located. Three nodes and three circles are enough to give an unambiguous solution at the intersection of the three circles (though more may be used to improve accuracy). However, with only two nodes, sometimes it may be possible to discount one of those points as being an unlikely or impossible solution, e.g. being a point in an area to which the user 10 does not have access or it is impossible to reach, or a point that is not consistent with a plotted trajectory (path) of the user 10 (elimination by "dead reckoning"). Similar comments may be made in relation to three-dimensional positioning: strictly four nodes defining four spheres are required to obtain an unambiguous solution, but sometimes an estimate may be made based on fewer nodes if additional information can be invoked. Assuming the user 10 is constrained to a particular level to constrain to a two-dimensional problem is an example of such information. As another example, it may be assumed the user 10 is found on one of a plurality of discrete floors, and/or a dead reckoning type approach may be used to eliminate unlikely jumps in the user's route.

By whatever technique the location is determined, this location may then be used to assess whether the mobile device 8 is granted access to some location-based service (LBS). To this end, there is provided a service access system 16 in the form of an LBS server, configured to conditionally grant access to the service in dependence on the absolute location of the mobile device 8. In a device centric approach the mobile device 8 submits its determined absolute location (e.g. in terms of global coordinates, map coordinates or coordinates on a floor plan) to the service access system 16 over a connection via the wireless access point 12 or other means such as a cellular connection. The service access system 16 then assesses this location and grants the mobile device 8 with access to the service on condition that the location is consistent with provision of the service (and any other access rules that happens to be implemented, e.g. also verifying the identity of the user 10). In a network centric approach, the location server 14 submits the determined absolute location of the mobile device 8 to the service access system 16, e.g. via a connection over a local wired or wireless network and/or over a wide area network or internetwork such as the Internet. Alternatively the location server 14 may send the absolute location to the mobile device 8, and the mobile device may then forward it on to the service access system 16. In another alternative the service could be provided directly from the location server 14, or could even be implemented on an application running on the mobile device 8 itself.

The following are some examples of location-related services or functions that may be provided in accordance with embodiments of the present disclosure:

allowing control of a utility such as lighting from an application running on the mobile device 8, where the user can only control the lighting or utility in a given room or zone when found to be located in that room or zone, or perhaps an associated zone;

providing a navigation service such as an indoor navigation service to the mobile device 8 (in which case the location-related function comprises at least providing the device's absolute location to an application running on the mobile device 8, e.g. which the application may then use to display the user's location on a floor plan or map);

providing location based advertising, alerts or other information to the mobile device 8, e.g. providing the device 8 with information on exhibits as the user 10 walks about a museum, providing the device 8 with information about products as the user 10 walks about a shop or mall, providing the device 8 with access to medical data only if present inside a hospital or specific zone within a hospital, or providing the device 8 with access to complementary media material only if present physically within a movie theatre or the like;

accepting location dependent payments from the mobile device on condition that the device 8 is present in a certain region, e.g. payments in shops, payment of road tolls, "pay as you drive" car rental, or entrance fees to venues or attractions;

providing access to medical data to a mobile device 8 on condition that the device 8 is detected to be within a hospital or other such medical facility; and/or providing access to complementary media material to a mobile device (8) on condition that the mobile device 8 is detected to be within a certain movie theatre.

With regard to security, provided that the localization messages are distributed internally within the localization system 4, 6, 14 security may be less of an issue; but in the case of two-way time of flight messages (RTT) for example, or where the reports are transmitted over a public network, it may be advantageous to provide them with a time-stamp (measurement time) or a nonce, and/or to "hash" the messages (digital signature) so as to thwart any replay attacks on the network backbone. The same could be done with the measurement reports sent to the location server 14. Such measures are not essential but may be desirable in embodiments, particularly if the location-based service or functionality is susceptible to abuse or involves financial transactions or the like.

Note that FIG. 2 shows arrows in all directions to illustrate the possibility of either device centric or network centric approaches, but in any given implementation not all the communications shown need be bidirectional or indeed present at all.

According to embodiments of the present disclosure, each of the anchor nodes 6 does not take the form of a dedicated, stand-alone anchor node, but rather a unit of another utility that is present in the environment 2 for another purpose, and which is exploited in order to incorporate the additional functionality of an anchor node. In one particularly preferred implementation, each of the anchor nodes 6 is incorporated into a respective "smart luminaire" having an RF transceiver such as a Wi-Fi, ZigBee or Bluetooth transceiver for facilitating wireless control of the lighting in the environment 2 (as discussed in more detail later), and the anchor node functionality 6 is incorporated by exploiting the existence of this RF transceiver to additionally broadcast and/or receive localization beacon signals for an additional purpose of locating a mobile device 8. The luminaires 6 may for example be installed in the ceiling and/or walls, and/or may comprise one or more free standing units.

Examples below may be described in terms of each of the anchor nodes 6 being incorporated into respective luminaires 6, but it will be appreciated that this is not limiting to all possible embodiments. E.g. in alternative arrangements, each of the anchor nodes 6 may be incorporated into any of a luminaire, a smoke alarm, a presence sensor and/or light sensor unit, a security alarm, an air-conditioning unit, a ventilation unit, or a heating unit (and each anchor node 6 does not necessarily have to be incorporated into the same type of unit, though they may be). In yet further alternatives, the anchor nodes 6 may be dedicated anchor nodes 6 having no other function than localization.

In embodiments the service access system 16 (LBS server) may be configured to control access to the control of the lighting 6. In this case, the access system 16 of the lighting controller is configured with one or more location dependent control policies. For example, a control policy may define that a user 10 can only use his or her mobile device 8 to control the lights in certain region such as a room only when found within that region or within a certain defined nearby region. As another example control policy, the mobile device 8 only controls those luminaires within a certain vicinity of the user's current location. However, note that this is only one example of a location-based service that may be provided based on the anchor nodes incorporated into the luminaires 6. In other examples, the control of the lighting could be unrelated to the localization in terms of its user-facing function, and instead the location-based service could be something else such as an indoor navigation service, location-based advertising, etc.

There is a trend toward having greater connectivity and intelligence in lighting systems. Wireless RF-networked lighting systems will play an important role with the desire for easier commissioning and control of lighting systems. A resulting consequence will be a dense deployment of wireless nodes, e.g. one wireless node per luminaire or a wireless node for a group of luminaires in a room.

The general localization system of FIGS. 1 and 2 has been described above in terms of more traditional localization techniques such as triangulation, trilateration, multilateration and fingerprinting. However, in the case of a dense array or other such dense distribution of anchor nodes 6, these can become computationally intense, and/or place an onerous commissioning burden on the commissioning technician (the coordinates of each node have to be known quite precisely). Therefore in preferred embodiments, the beacon signals are instead processed according to a zoning-based technique as discussed below.

Figure 3:
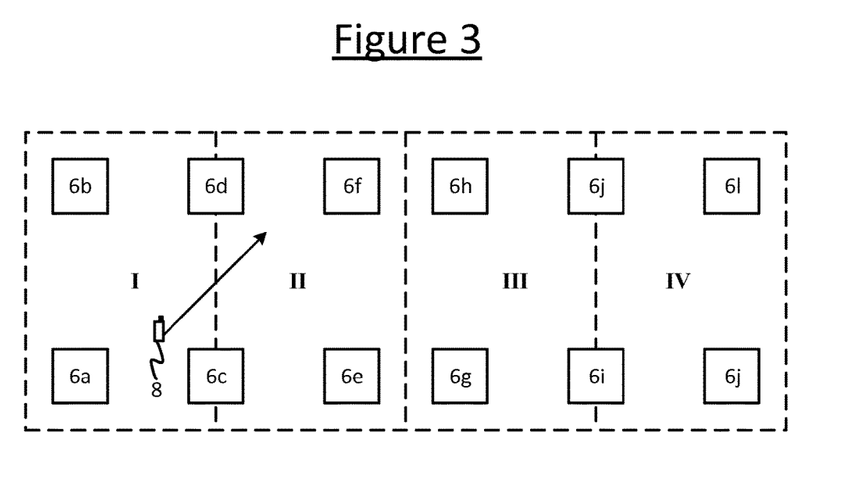
FIG. 3 is a schematic illustration of a zoning scheme for estimating the location of a mobile device.

FIG. 3 gives a simplified block diagram of a zoning-based arrangement. The horizontal user plane in which positioning information is of interest is logically divided into multiple zones, e.g. in the illustrated example zones I, II, III, IV. These zones may be defined, for instance, by tailoring them to a specific application or service, or may be generically defined.

To this end, the location server 14 is configured with knowledge of a mapping of anchor nodes 6 to zones. It comprises a location database 20 which maps an identifier of each anchor node 6 to a respective zone or zones to which that node belongs (zones may overlap). Each zone may be referred to by a respective index in the database 20.

An example mapping in the database 20 would be as follows (and as also illustrated in FIG. 3).

| Anchor nodes | Zone |
| --- | --- |
| 6a, 6b, 6c, 6d | I |
| 6c, 6d, 6e, 6f | II |
| 6g, 6h, 6i, 6j | III |
| 6i, 6j, 6k, 6l | IV |

There are various different ways in which the anchor nodes 6 may be mapped to correspond to different zones. For example, the anchor nodes 6 corresponding to each zone may be those that are spatially or geographically within the area of the respective zone in the horizontal plane (optionally including being on the boundary). Alternatively, the anchor nodes corresponding to each zone may be those within beaconing range of the respective zone according to some defined threshold (e.g. a minimum threshold for signal detection). I.e. an anchor node 6 may be programmed into the database 20 as corresponding to a given zone if (in a device centric case) it emits a beacon signal that will arrive above the threshold strength at any point in the zone, or (in a network centric case) if would receive a beacon signal with above the threshold strength from a mobile device 8 at any point within the zone. This could be based on a theoretical model or an empirical commissioning step. Note: the database 20 does not need to be configured to understand the basis upon which the anchor nodes 6 have been mapped to corresponding zones; rather, it only needs to store the mapping itself.

A localization module 15 implemented on the location server 14 is configured to use the database 20 and, in conjunction with the measurements (e.g. RSSIs) of the beacon signals, to use this to perform a zoning type localization of the mobile device 8 in accordance with the following. The localization module 15 is preferably implemented in software stored on one or more storage devices of the location server 14 and arranged to run on one or more processing units of the location server 14. Alternatively however, it is not excluded that the localization module could be implemented in dedicated hardware circuitry, or configurable or reconfigurable hardware circuitry such as a PGA or FPGA (in this respect note that a server herein may refer to anything providing a serving functionality, and not necessarily a computer running software, albeit that being a preferred implementation).

By whatever means implemented, the localization module 15 is arranged to receive the signal measurements from the nodes 6 (in a network-centric case) or from the mobile device 8 (in an assisted device-centric case). The localization module 15 is configured to then use the measurements of these signals, in conjunction with the location database 20, in order to determine which zone I-IV the mobile device apparently belongs to. Belonging to here may mean which zone the mobile device 8 is in, or which zone it is closest to.

To do this, the localization module 15 receives the signal measurements for the anchor nodes 6 of each zone. That is, for each zone, it receives a measurement based on the signals received at (network centric) or from (device centric) the anchor nodes 6 belonging to that zone. Typically this will be a measure of the received signal strength (e.g. RSSI) or time-of-flight (ToF). The localization module 15 then compares these measurements are to determine which zone (or zones) the mobile device 8 appears to be in or closest to.

Particularly, the localization module 15 does not just use the current, instantaneous beacon measurements, but rather is configured to use both past and current beacon measurements to determine the one or more zones to which the mobile device 8 belongs. This effectively takes into account a likelihood of continuity as the mobile device (8) moves between zones over time. E.g. if the user was in zone II at the last determination, then at the next determination he or she is likelier to be in zones I, II or III rather than zone IV. For example this may be performed as follows.

Let Sj denote the j-th zone; and RSSI(n, k) denote the average RSSI value of anchor node n, at time k averaged over a window of W samples up to and including time k. A tracking score may then be constructed as:

$$A(k, j) = c \cdot A(k-1, j) + \frac{1}{|sj|} \sum_{n \in Sj} RSSI(n, k) \quad \text{Equation (1)}$$

At time instant k, the user is then declared in zone j* where:

$$j^* = \max_j A(k,j) \quad \text{Equation (2)}$$

While methods of this kind may be less complex or even in some circumstances more effective compared to other techniques such as triangulation, trilateration or multilateration; both these and zoning-based methods still have the potential to suffer from the intrinsic randomness in radio signal measurements. For instance, even when a user device is static, the position may fluctuate due to variations in RSSI measurements. This may in turn result in denying a user of a particular location-based service over periods of time and/or over regions.

In the following, there are provided techniques to improve the performance of localization by combining inertial sensing with the zoning method, in both network-centric and device-centric positioning modes.

In a network-centric implementation of this, the mobile device 8 transmits beacons for positioning (in embodiments at a frequency determined by a movement class pertaining to the mobile device 8), and the mobile device 8 transmits assistance data to the positioning system in the form of a movement class and device ID. Based on RSSI measurements received at the anchor nodes 6 and assistance data pertaining to the movement class of the mobile device 8, RSSI zoning parameters are adapted and zoning is performed to determine the position of the device, wherein the RSSI parameter adaptation duration is over the duration that a device is estimated to be in a specified class.

In a device-centric implementation, RSSI zoning parameters are chosen based on a movement class pertaining to the mobile device 8, and zoning is performed based on the chosen parameters in order to determine the position of the device, wherein the RSSI parameter adaptation duration is over the duration that a device is estimated to be in a specified class.

A first, network-centric embodiment is discussed in relation to FIG. 2. As discussed, in such a system, the anchor nodes 6 perform radio signal measurements and, based on these, the localization module 15 at the location server 14 performs the positioning of the mobile user device 8. In an augmentation of this arrangement according to the first embodiment disclosed herein, the mobile device 8 comprises one or more inertial sensors 9 such as one or more accelerometers, gyroscopes and/or magnetometers. These are used to estimate a movement class of the mobile user device 8 based on signals collected from the one or more sensors 9. The movement class is a discrete categorization of the type of movement the mobile device 8 is undergoing. This may be computed at the mobile device based on the sensor readings then the class reported to the localization module 15 on the location server 14. Alternatively the mobile device 8 may report the sensor readings to the localization module 15 in raw or partially processed form, in which case the localization module 15 computes the movement class at the location server 14 based on the received readings.

As an illustrative example, the movement class is either: static, walking, or indeterminate. A static classification may be detected on the basis that the sensor readings show no movement or only small movements (e.g. the motion is really because the user is fidgeting or moving the mobile device 8 in his or her hand, such as to hold the mobile device to the ear, etc.); whereas the motion is classified as walking if one or more predetermined characteristic features associated with walking are identified based on the sensor readings (e.g. the motion is sustained and consistently in a specific direction). An indeterminate classification on the other hand may optionally be declared if the sensor readings do not clearly show the signature characteristics of either a static or a walking user.

As an example of how to implement such as classification, the accelerometer sensor readings along the x-, y-, and z-axes are pre-filtered and the norm is obtained at sample time, k, i.e. $a(k)=\sqrt{a_x(k)^2+a_y(k)^2+a_z(k)^2}$; and compared with a threshold T1. If within a time window Tw, the number of times a(k) is less than T1 is less than a value N1, the device is declared to be in a class of small movements, and hence classified as static. If on the other hand within the time window Tw, the number of times a(k) is greater than T1 is higher than a value N2, the mobile device 8 is declared to be in a class of walking. Additional features like periodicity in horizontal and vertical acceleration may be checked before declaring the device 8 to be in the walking class. If none of the above conditions is satisfied, the mobile device 8 is stated to be in an indeterminate class.

The movement class along with device ID is sent to from the mobile device 8 to the localization module 15 as assistance data (or as mentioned above the localization module 15 may compute the movement class based on reported sensor readings). The movement class is then be used by the localization module 15 to select zoning parameters for use in the zoning-based localization of the mobile device 8.

As an example, consider the zoning method of Equations (1) and (2) above. In this zoning method, parameters c, W and Sj constitute the zoning parameters, and one or more of which may be adapted to the movement class. For instance, if the movement class is static (no more than small movements), then the value W may be increased beyond a default value, and/or the value of c may be lowered below a default value. This has the effect that RSSI values are weighted averaged over a longer duration and intrinsic variability in the resulting value is reduced, leading to a more stable position estimates. In one particularly effective implementation of this, the RSSI values may be averaged over the duration for which the device has been identified to be in the static class (i.e. again, no more than small movements detected). Or more generally, the averaging window may be applied over a duration over which the device is in a particular class.

Thus, the algorithm decides which zone the mobile device 8 is most likely to belong to (to be in or closest to) by evaluating a "score" A(j) for each zone j, and declaring the user to belong to the zone with the highest score. The score at a current time k is based on the current and past beacon measurements experienced over a time window W, and also on the previous score at time k−1. This gives a certain "stickiness" to the zoning, so the algorithm does not suddenly declare the mobile device 8 to be in a new zone just because there is a random fluctuation in the RSSIs. This stickiness—or put another way, the "memory" of the algorithm—is then adapted based on the detected motion of the mobile device 8 (e.g. based on the sensors 9), by adapting the averaging window W and/or the relative weighting given to the past score A(k−1).

Further, the detected motion of the mobile device 8 (e.g. movement class) can be used to adapt not only the zoning-based location algorithm, but also one or more properties of the beaconing. For instance, the time-density (e.g. frequency) of the beaconing from the mobile device 8 may be adapted in dependence on the detected motion of the mobile device 8, e.g. in dependence on the motion class, such that the beaconing time-density is increased in response to a greater degree of motion of the mobile device, relative to a lesser time-density when there is a lesser degree of motion (and adapting the time-density of the beaconing could be adapting frequency of a periodic transmission, or adapting probability of a randomized transmission). E.g. if the movement class is static, the beaconing frequency or time-density may be reduced. An advantage of such techniques is that the device 8 can save power without sacrificing on positioning accuracy too much. If on the other hand the movement class is walking (or more generally not static), the beaconing frequency or time-density may be set higher, and if the movement class is indeterminate, the beaconing frequency is left unchanged with respect to the current value or a default value. Alternatively or additionally, the beaconing frequency or time-density could be increased when the user is classed as running relative to when classed as walking, or when the mobile device is detected to exceed a threshold speed relative to when within the threshold speed, or the beaconing frequency or time-density could be adapted in proportion to the device's speed.

To implement this, the localization module 15 may determine the desired update to the beaconing time-density (e.g. beaconing rate) and send a request to adapt the beaconing to the mobile device 8, which in response adapts its beaconing accordingly. Or the localization module 15 may send the determined motion class from the server 14 to the mobile device 8, which may be configured to adapt its beaconing time-density in dependence on the received class. Or as another alternative, the mobile device 8 may be configured to determine its own motion (e.g. its own motion class) in parallel with the determination performed by the localization module 15 at the server 14, and to adapt its beaconing time-density based on this.

As another example of adapting the beaconing-related behaviour of the system, the localization module 15 may control the anchor nodes 6 so that only those anchor nodes 6 in the mobile device's currently detected zone are activated to listen for beaconing signals from the mobile device 8 (i.e. activated to detect the beacon signals and take measurements of them if detected). And/or, based on detecting the fact that the mobile device 8 is moving and detecting the direction of motion (e.g. using the on-board sensors 9), it may be possible to anticipate the next zone the mobile device 8 is about to move into. In this case, the localization module 15 may be configured to detect this anticipated transition and to control the anchor nodes 6 so that only the nodes of the next zone, or only those of the current and next zone, are activated to listen for beaconing signals from the mobile device 8. These techniques again help save power, by avoiding powering up the receivers of those nodes 6 which are unlikely to make a useful contribution to the localization.

In a second embodiment of the present disclosure, consider now a device-centric positioning system in which the localization module 15 is not implemented in the server 14, but rather in the mobile device 8. In such a system, the anchor nodes 6 transmit radio beacons and the mobile device 8 performs the radio signal measurements for determining its own location. In this case, the localization module on the mobile device 8 may be configured to perform any of the zoning-based localization techniques and adaptation of the zoning-based localization algorithm as discussed above, but this time based on measurements of the beacon signals from the anchor nodes 6 as received at the mobile device 8, and based on a detection of the device's own motion. For example, the localization module on the mobile device 8 may use the device's own on-board inertial sensor(s) 9 to detect its own motion, and to determine its own movement class (based on similar techniques as described earlier). Based on the movement class, the device's localization module then adapts one or more of the parameters for the zoning method, and RSSI-based zoning is performed in order to determine the device location.

Further, in the device centric case, the detected motion of the mobile device 8 (e.g. movement class) can again be used to adapt not only the zoning-based location algorithm, but also one or more properties of the beaconing. For instance, the time-density of the beaconing from one or more of the anchor nodes 6 may be adapted in dependence on the detected motion of the mobile device 8, based on similar principles to those discussed above. That is, the beaconing from one, some or all of the nodes 6 may be adapted such that the beaconing time-density is increased in response to a greater degree of motion of the mobile device 8, e.g. the detected class, relative to a lesser time-density when there is a lesser degree of motion (and again adapting the time-density of the beaconing could be adapting frequency of a periodic transmission, or adapting probability of a randomized transmission). E.g. if the movement class is static, the anchor beaconing frequency or time-density may be reduced, while if on the other hand the movement class is walking (or more generally not static), the anchor beaconing frequency or time-density may be set higher, and if the movement class is indeterminate, the anchor beaconing frequency is left unchanged with respect to the current value or a nominal value, Or alternatively or additionally, the anchor beaconing frequency or time-density could be increase when the user is classed as running relative to when classed as walking, or when the mobile device is detected to exceed a threshold speed relative to when within the threshold speed, or the anchor beaconing frequency or time-density could be adapted in proportion to the device's speed.

As another example of adapting the beaconing of the anchor nodes, the localization module on the mobile device 8 or location server 14 may control the anchor nodes 6 so that only those anchor nodes 6 in the mobile device's currently detected zone emit beacon signals, or that those anchor nodes 6 emit beacons with a higher time-density (e.g. rate). And/or, based on detecting the fact that the mobile device 8 is moving and the direction (e.g. using the on-board sensors 9), it may be possible to anticipate the next zone the mobile device 8 is about to move into. In this case, the localization module may be configured to detect this anticipated transition and to control the anchor nodes 6 so that only the nodes of the next zone, or only those of the current and next zone, are activated to transmit beaconing signals from the mobile device 8, or that those nodes emit beacons with a higher time-density (e.g. rate). These techniques again help save power, by avoiding transmission of beacon signals from those nodes 6 which are unlikely to make a useful contribution to the localization.

For instance, referring to FIG. 3, consider that the mobile device 8 is currently in zone I. When the mobile device 8 is classed as stationary, the nodes 6a-6d in zone I may be set to emit beacon signals while the other nodes 6e-6j not in that zone are set not to emit beacon signals, or the nodes 6a-6d in zone I may be set to emit beacon signals more often per unit time while the other nodes 6 not in that zone are set to emit beacon signals less often relative to those of zone I. On the other hand, if it can be inferred from the detected motion that the mobile device is about to enter, say, zone II, then the nodes 6c-6f in zone II (or the nodes 6a-6f in both zone I and II) may be set to emit beacon signals while the other nodes 6a-6b and 6h-6j not in that zone (or nodes 6h-6j not in those zones) are set not to emit beacon signals. Or the nodes 6c-6f in zone II (or the nodes 6a-6f in both zone I and II) may be set to emit beacon signals more often per unit time while the other nodes 6a-6b and 6h-6j not in that zone (or nodes 6h-6j not in those zones) are set to emit beacon signals less often relative to those of zone II (or zone I and II).

In yet another example, the order and/or shape of the zoning may be adapted in dependence on the detected motion of the mobile device 8. For instance, suppose a room or other environment is divided into a matrix of zones "x", each comprising a respective one or more of the anchor nodes 6:

|   | 1 | 2 | 3 | 4 |
|---|---|---|---|---|
| a | x | x | x | x |
| b | x | x | x | x |
| c | x | x | x | x |
| d | x | x | x | x | where the zones are arranged into rows a-d and columns 1-4 of the matrix. Assume for the sake of illustration that at time t=0 a person was in zone (a,1). Suppose he (and his device 8) was also stationary at that time according to the motion sensor 9. If so then at t=0, the nodes may be controlled to: firstly beacon in the zones of row a, and then secondly beacon in the zones of column 1 (or vice versa), then optionally beacon in the other zones. In contrast if the person moves (with his device 8) at a later time t=1, then at t=1 the nodes may be adapted to first beacon in the zones of row b, and then secondly beacon in the nodes of column 2 (or vice versa), then optionally beacon in the other zones. Thus it is possible to choose which zone to trigger first based on the detected motion (mode dependent zoning). Generally, this may comprise changing the order and/or distribution of which nodes 6 or zones beacon, and/or the order in which to attempt detection, so as to check those areas where the person is most expected to be found in first. Something similar may also be implemented by changing the zone shapes so as to cover the most likely areas first.

It will be appreciated that this is just one example, and in embodiments any one of various properties of any one or more of the zones may be adapted in dependence in the detected motion state of the mobile device 8, such as the beaconing time-density, distribution, zone size, and/or zone shape. For instance, two devices in different motion states may apply a different size and/or shape of a zone to determine position. E.g. one use of this could be to adapt the resolution of the zones in dependence on the detected motion: the size of the zones may be set to be larger when the device 8 is detected to be moving (or moving more quickly) while the zones may be set to be smaller when the device 8 is detected to be stationary (or moving less quickly).

In the various examples above, to implement the adaptation of the beaconing time-density and/or the adaptation of which nodes emit beacon signals, the localization module on the mobile device may determine the desired update to the beaconing and send a request to adapt the beaconing to the localization sever 14, which in response adapts the beaconing from the anchor nodes 6 accordingly. Or the localization module of the mobile device 8 may send its determined motion class to the server 14, which may be configured to adapt the anchor beaconing in dependence on the received class. Or as another alternative, the localization 8 may be configured to determine the motion of the mobile device 8 (e.g. the motion class) in parallel with the determination performed by the localization module on the mobile device (e.g. based on the sensor reading reported from the mobile device 8 to the server 14, or by tracking a location estimate in parallel with the device-centric localization), and to adapt the beaconing from the nodes 6 based on this.

In yet another implementation, the disclosed techniques could be implemented in an assisted (hybrid) arrangement in which the localization module 15 is implemented on the location server 14, and the anchor nodes transmit the beacon signals to be received and measured by the mobile device 8, but the mobile device 8 reports the beacon measurements in raw or partially processed form to the localization module 15 on the location server 14 for the zoning-based localization algorithm to be applied there. In this case the localization module 15 detects the mobile device's motion in a similar manner to the network centric case, such as by receiving the motion class from the mobile device 8, receiving the sensor readings from the mobile device 9, or following the location estimates performed by the localization module 15 itself at the localization server 14. However, in embodiments of the assisted case, the localization module 15 on the localization server 14 can also control the transmission of the beacon signals emitted by the anchor nodes 6, such as to control the time-density (e.g. rate) of the beacon signals, and/or to control which zones beacon and/or when, such as in accordance with one or more of the example schemes discussed above.

It will be appreciated that the above embodiments have been described only by way of example.

For instance, the illustrated zones in FIG. 3 are just one example, and in alternative arrangements any number of zones of any size and shape, containing any number of nodes 6 each, may be implemented (the zones not necessarily being the same size or shape as one another).

Further, other schemes for the discrete classification of the mobile device's movement are possible. For example, as an alternative or in addition to classifying whether or not the mobile device 8 is static, the inertial sensor readings may exhibit characteristics allowing it to be determined whether the user 10 of the mobile device 8 is walking or running, and/or whether travelling on foot or by vehicle, and/or whether above or within a threshold speed, etc.

Also, the detection of the mobile device's state of motion could be based not (or not only) on sensor readings from the inertial sensor(s) 9 on-board the mobile device 8, but alternatively or additionally based on following the tracking of the existing localization of the mobile device 8 already being performed by the localization module 15 itself. E.g. if all the latest localizations over some predetermined time span up to the present moment have found the device to be in the same zone, then the mobile device may be classified as static; but on the other hand if the estimated zone has changed in that time, then the mobile device may be classified as moving. As another example, the motion of the mobile device 8 could be detected based on a separate motion detection system installed in the environment 2, such as a presence or occupancy sensing system employing one or more remote motion sensors such active ultrasound sensors, or passive or active infrared sensors, or 2D or 3D (depth aware) cameras with image recognition.

Note that some embodiments of these variants may work by detecting the device 8 directly, while other embodiments of these variants work by detecting the user 10 of the mobile device 8 and assuming the device moves with the user 10. For instance, when using on-board device sensors 9, the motion state is that of the device 9; but when using one or more cameras or other presence sensors that are installed in the environment 2, the motion state is that of a user 10 and needs to be linked to a device ID. In the latter case, the motion of the mobile device is detected indirectly by detecting motion of a user 10 accompanying the mobile device 8.

Further, the beacon signals do not necessarily have to be radio signals. In alternative embodiments, the disclosed techniques may be applied to other modalities such as visible light, ultrasound or infrared, etc.

Furthermore, the above technique of adapting the relative significance of current and past beacon measurements can be applied to other algorithms, other than the exemplary algorithm of Equations (1) and (2) above. For instance, the score A may computed only as the average RSSI value (right-hand term of Equation 1), or only based on weighted current and past terms (both left and right hand terms of Equation 1, but using only spatial averaging in the right hand term, not time averaging to take into account past measurements in the right hand term).

In further examples, the localization algorithm does not even have to be a zoning-based algorithm. Alternatively, even a continuously variable estimate, or approximation thereof, could also benefit from principle that a stronger memory of past beacon measurements is more appropriate when the mobile device is undergoing little or no motion, and a weaker memory of past beacon measurements is more appropriate when the mobile device 8 is undergoing more motion. I.e. the principle can even apply without restricting the estimate to discrete zones, so that the position estimate reacts more slowly when the user is detected to be stationary than when walking, or the like. E.g. if the zone sizes are shrunk to one or fewer anchor nodes per zone, these "zones" effectively become a quantized candidate locations. So a score-based algorithm such as that of Equations (1) and (2) above, could be used down to any resolution of location estimate desired, where the candidate locations are not necessarily to zones corresponding to different groups of nodes.

Or in yet further examples, instead of a score-based algorithm like that of Equations (1) and (2), the adaptation may be applied to a trilateration, multilateration or triangulation type location calculation. In this case, the trilateration, multilateration or triangulation may be performed using not only the instantaneous values of the beacon measurements from each node, but the average beacon measurements over a time window W for each node. By adapting the length of the time window W based on the motion of the mobile device 8, then the estimate can be made more responsive when the mobile device 8 is moving and more "sticky" (a greater resistance to change) when the device is stationary.

The underlying principle is that relative significance attributed to past measurements vs. current measurements is adapted based on the detected motion of the mobile device. If the user is not walking about or moving significantly, it is less likely that a change in the current beacon measurements is due to real motion of the user as opposed to inherent inaccuracy in the system, and vice versa. Any scheme making use of this principle can fall within the scope of the present invention.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or

The invention claimed is:

1. Apparatus comprising a processor for executing a localization module configured to perform operations of:
   detecting motion of the mobile device using one or more sensors;
   repeatedly executing on one or more processors, a tracking algorithm to track a location of the mobile device based on measurements of beacon signals transmitted between the mobile device and wireless reference nodes of a localization network, wherein the tracking algorithm is configured to estimate a current location of the mobile device by taking into account both a current set of measurements of the beacon signals transmitted between the mobile device and at least some of said reference nodes and one or more past sets of said measurements transmitted between the mobile device and at least some of said reference nodes; and
   adapting the tracking algorithm by, in dependence on said detected motion, adapting a relative significance attributed to the one or more sets of past measurements relative to the current set of measurements;
   wherein the localization module is further configured to adapt a time-density of one, some or all of said beacon signals in dependence on the detected motion of the mobile device, such that the time-density is increased when the mobile device is detected to exhibit a greater degree of motion.

2. The apparatus of claim 1, wherein the tracking algorithm is configured to estimate the current location of the mobile device, based on said current and past measurements, in terms of which of a plurality of discrete zones the mobile device is presently estimated to belong to, each respective one of the zones corresponding to a respective group of the reference nodes.

3. The apparatus of claim 1, wherein the localization module is configured to detect the motion of the mobile device by determining a discrete classification of a state of said motion, and to perform said adaptation based on the discrete classification.

4. The apparatus of claim 3, wherein said discrete classification comprises one or more of:
   whether the mobile device is static or moving,
   whether a user accompanying the mobile device is static or walking,
   whether a user accompanying the mobile device is walking or running,
   whether the motion is indicative of the mobile device travelling beyond a threshold speed or within the threshold speed,
   whether a user accompanying the mobile device is travelling on foot or by vehicle, and/or
   whether the state of motion is one of the above or is indeterminate.

5. The apparatus of claim 1, wherein the algorithm comprises an average contribution of some or all of the current measurements and some or all of the past measurements, averaged over a time window, and the localization module is configured to perform said adaptation by adapting said time window.

6. The apparatus of claim 1, wherein the algorithm comprises a first term based on only some or all of the current measurements or only some or all of the past measurements, and a second term at least based on some or all of the other of the current or past measurements, with one or both of the first and second terms being weighted by a respective weighting parameter; and wherein the localization module is configured to perform said adaptation by adapting the weighting parameter of one or both of the first and second terms.

7. The apparatus of claim 6, wherein said parameter is a factor by which the respective term is multiplied.

8. The apparatus of claim 6, wherein said first term is based on only some or all of the past measurements, and said second term comprises an average contribution of some or all of the current measurements and some or all of the past measurements, averaged over a time window.

9. The apparatus of claim 8, wherein:
   the tracking algorithm is configured to operate by allocating a respective score to each respective one of some or all of the zones representing a likelihood that the mobile device belongs to the respective zone, and selecting the zone having the highest score as the zone in which the mobile device is estimated to belong to;
   the score for each zone comprises a sum of said first term and said second term, the first term comprising the respective score from a previous one of said repeated applications of said algorithm, and the second term comprising the average, over said time window, of the current and past measurements of the beacon signals transmitted between the mobile device and only the reference nodes corresponding to the respective zone; and
   the localization module is configured to perform said adaptation by adapting the time window of the average and/or the weighting parameter of one or both of the first and second terms.

10. The apparatus of claim 2, wherein:
    the beacon signals are transmitted from the reference nodes to the mobile device, and wherein the localization module is further configured to control the beacon signals to only be transmitted from the reference nodes corresponding to the zone which the mobile device is currently estimated to belong to, and/or from one or more adjacent zones to that which the mobile device is currently estimated to belong to; or
    the beacon signals are transmitted from the reference nodes to the mobile device, and wherein the localization module is further configured to control the beacon signals to be transmitted with a greater time-density from the reference nodes corresponding to the zone which the mobile device is currently estimated to belong to, and/or with a greater time-density from one or more adjacent zones to that which the mobile device is currently estimated to belong to, the time-density being greater relative to one, some or all others of said zones;
    the beacon signals are transmitted from the mobile device to the the reference nodes, and wherein the localization module is further configured to control the reference nodes so that only the reference nodes corresponding to the zone in which the mobile device is currently estimated to be, or only a subset of the zones comprising the zone in which the mobile device is currently estimated to be and one or more adjacent zones, take measurements of the beacon signals.

11. The apparatus of claim 1, wherein said apparatus is a location server of the localization network; the detection of said motion comprising: receiving an indication of the motion from the mobile device, and/or observing the tracked location of the mobile device at the server, and/or receiving an indication of the motion from a separate motion sensing system.

12. The apparatus of claim 1, wherein said apparatus is the mobile device; the detection of said motion comprising: using one or more inertial sensors of the mobile device to sense the motion, and/or observing the tracked location of the mobile device at the mobile device, and/or receiving an indication of the motion from a separate motion sensing system.

13. A method of tracking a location of a mobile device comprising steps of:
- detecting motion of the mobile device using one or more sensors;
- repeatedly executing on one or more processors, a tracking algorithm to track a location of the mobile device based on measurements of beacon signals transmitted between the mobile device and wireless reference nodes of a localization network, wherein the tracking algorithm is configured to estimate a current location of the mobile device by taking into account both a current set of measurements of the beacon signals transmitted between the mobile device and at least some of said reference nodes and one or more past sets of said measurements transmitted between the mobile device and at least some of said reference nodes; and
- adapting the tracking algorithm by, in dependence on said detected motion of the mobile device, adapting a relative significance attributed to the one or more sets of past measurements relative to the current set of measurements;
- wherein the method further comprises a step of adapting a time-density of one, some or all of said beacon signals in dependence on the detected motion of the mobile device, such that the time-density is increased when the mobile device is detected to exhibit a greater degree of motion.

14. A non-transitory computer readable medium containing program instructions that, when executed on a processor, cause the processor to perform the steps of:
- detecting motion of the mobile device using one or more sensors;
- repeatedly executing on one or more processors, a tracking algorithm to track a location of the mobile device based on measurements of beacon signals transmitted between the mobile device and wireless reference nodes of a localization network, wherein the tracking algorithm is configured to estimate a current location of the mobile device by taking into account both a current set of measurements of the beacon signals transmitted between the mobile device and at least some of said reference nodes and one or more past sets of said measurements transmitted between the mobile device and at least some of said reference nodes; and
- adapting the tracking algorithm by, in dependence on said detected motion of the mobile device, adapting a relative significance attributed to the one or more sets of past measurements relative to the current set of measurements;
wherein the method further comprises a step of adapting a time-density of one, some or all of said beacon signals in dependence on the detected motion of the mobile device (8), such that the time-density is increased when the mobile device (8) is detected to exhibit a greater degree of motion.

* * * * *